(12) United States Patent
Chung et al.

(10) Patent No.: US 7,136,901 B2
(45) Date of Patent: Nov. 14, 2006

(54) ELECTRONIC MAIL SERVER

(75) Inventors: Edmon Chung, North York (CA);
David Leung, Richmond Hill (CA);
Jimmy Lam, Toronto (CA)

(73) Assignee: Neteka Inc. (CA)

( * ) Notice: Subject to any disclaimer, the term of this patent is extended or adjusted under 35 U.S.C. 154(b) by 68 days.

(21) Appl. No.: 10/155,219

(22) Filed: May 28, 2002

(65) Prior Publication Data

US 2003/0046353 A1 Mar. 6, 2003

Related U.S. Application Data

(63) Continuation of application No. PCT/CA00/01394, filed on Nov. 27, 2000.

(60) Provisional application No. 60/167,624, filed on Nov. 26, 1999.

(30) Foreign Application Priority Data

Jun. 27, 2000 (CA) .................................... 2312540

(51) Int. Cl.
*G06F 15/16* (2006.01)

(52) U.S. Cl. ...................................... 709/206; 709/245

(58) Field of Classification Search ................ 709/206, 709/245, 203, 227, 228; 704/8; 341/67, 341/106; 707/10, 3, 6
See application file for complete search history.

(56) References Cited

U.S. PATENT DOCUMENTS 5,333,317 A  7/1994 Dann ........................ 395/600

(Continued)

FOREIGN PATENT DOCUMENTS

EP    0 565 850 A1    10/1993
WO   W0 00/50966     8/2000

OTHER PUBLICATIONS

Seng et al., "iDNS—The Next Big Step in the Internet Saga", i-DNS.net Technology White Paper Dec. 1999.*
K. Moore, "MIME (Multipurpose Internet Mail Extensions) Part Three: Message Header Extensions for Non-ASCII Text", XP-002175815, IETF/RFC 2047, Nov. 1996.*

(Continued)

*Primary Examiner*—William Vaughn
*Assistant Examiner*—Joseph Maniwang
(74) *Attorney, Agent, or Firm*—Katten Muchin Rosenman LLP

(57) ABSTRACT

An electronic mail server is provided to facilitate e-mail communication over a network. The electronic mail server includes an account name database and an account name processor in communication with the account name database for providing a response to a message received over the network. Typically, the message includes an e-mail account name label comprising at least one account name character (having an account name character set type), with the character set type including a non-ASCII compatible character set. The account name database includes a number of database records, each identifying an e-mail account name comprising at least one record character having a record character set type, and a record character set identifier identifying the record character set type. The account name processor includes a correlation processor and a response processor. The correlation processor is configured to determine the correlation between the received e-mail account name/label and the respective e-mail account names in accordance with the associated character set type. The response processor is in communication with the correlation processor and provides the response to the message in accordance with the correlation indication.

9 Claims, 7 Drawing Sheets

U.S. PATENT DOCUMENTS

| | | | | |
|---|---|---|---|---|
| 5,682,158 | A * | 10/1997 | Edberg et al. | 341/90 |
| 5,835,912 | A * | 11/1998 | Pet | 707/104.1 |
| 5,929,792 | A * | 7/1999 | Herriot | 341/55 |
| 6,182,148 | B1 * | 1/2001 | Tout | 709/245 |
| 6,230,156 | B1 * | 5/2001 | Hussey | 707/10 |
| 6,292,770 | B1 * | 9/2001 | Zerber | 704/8 |
| 6,314,469 | B1 * | 11/2001 | Tan et al. | 709/245 |
| 6,334,140 | B1 * | 12/2001 | Kawamata | 709/202 |
| 6,449,657 | B1 * | 9/2002 | Stanbach et al. | 709/245 |
| 6,539,118 | B1 * | 3/2003 | Murray et al. | 382/229 |
| 6,560,596 | B1 * | 5/2003 | Margulies et al. | 707/4 |
| 6,807,254 | B1 * | 10/2004 | Guedalia et al. | 379/88.1 |
| 2001/0025320 | A1 * | 9/2001 | Seng et al. | 709/245 |
| 2003/0088704 | A1 * | 5/2003 | Mertama et al. | 709/246 |

OTHER PUBLICATIONS

H. Alvestrand, "IETF Policy on Character Sets and Languages", XP-002175816, IETF/RC 2277, Jan. 1998, pp. 1-9.

K. Moore, "MIME (Multipurpose Internet Mail Extensions) Part Three: Message Header Extensions for Non-ASCII Text", XP-002175815, IETF/RFC 2047, Nov. 1996, pp. 1-15.

* cited by examiner

302

304a { 〒 ※ }     BIG5 306a

304b { 丁 ¥ }     GB2312 306b

304c { # 丄 }     GB2312 306c

304d { 丄̄ ¥ }     BIG5 306d
       ※

ELECTRONIC MAIL SERVER

RELATED APPLICATIONS

This application a continuation of international application PCT/CA00/01394 filed Nov. 27, 2000, which is a continuation of US Provisional application Ser. No. 60/167,624 filed Nov. 26, 1999.

FIELD OF THE INVENTION

The present invention relates to a system and method for facilitating the transmission and delivery of electronic mail over a wide area network. In particular, the present invention relates to an electronic mail server configured to recognize e-mail account identifiers consisting of non-ASCII characters.

BACKGROUND OF THE INVENTION

In order to facilitate communication between communication devices over a network, each network device is typically assigned a unique numeric network address. A user associated with one of the network devices then need only provide the network transport layer with the numeric network address of the intended target to communicate with the target. Although this system functions satisfactorily in small network where users only communicate with a small number of network communication devices, the system cannot be readily transported to large networks since it would require each network user to remember a large number of unique numeric network addresses. For this reason, the domain name system (DNS) was proposed by Mockapetris in 1987 (RFC 1034 and RFC 1035, Network Working Group; presently available at "http://www.ietf.org") as a mechanism for facilitating communication between communication devices over the Internet.

The DNS facilitates Internet communication by associating domain names with the numeric (IP, "Internet Protocol") network addresses. The DNS basically consists of resource records, domain name servers, and resolver. Each resource records includes information concerning each network node, including the IP address of the network node, and the domain names associated with the IP address. Together, the resource records provide the Internet with a tree-structured domain name space. Domain name servers are Internet servers which retain information concerning the domain name space. In particular, each domain name server has a file ("zone file") which retains resource records associated with its own subset of the domain name space. These records are referred to as "authoritative" records. Also, though queries from resolvers, domain name servers also temporarily cache copies of resource records acquired from other domain name servers in order to improve the performance of the retrieval process when non-local data is requested by a resolver. Resolve are local programs which extract information from domain name servers in response to client requests.

Typically, the domain name associated with a network device at particular IP address has a top label field, and one or more lower level label fields. The label fields comprising a domain name are separated from one another through a delimiter (".") and are each positioned in the domain name according to their respective relative levels in the domain name hierarchy. To transmit an e-mail message to a recipient having an e-mail account subsisting at a remote network device, using the originator's local computer the originator of the e-mail message provides its e-mail server with the electronic mail message, together with the originator's name, the domain name of the e-mail server in which the originator has established an e-mail account, the recipient's name, and the domain name of the e-mail server in which the recipient has established an e-mail account. In effect, each e-mail account is represented on a e-mail server as a distinct directory, each containing a subdirectory for caching incoming e-mail messages and a sub-directory for caching outgoing e-mail messages.

Upon receipt of the e-mail message from the originator, the originators e-mail server assigns a globally unique message identifier (determined in accordance with the time of receipt of the e-mail message), extracts the domain name of the recipient's e-mail server from the e-mail message, and transmits the extracted domain name to a domain name resolver for determination of the IP address of the recipient's e-mail server. The resolver queries a root DNS server with the top level label identified in the domain name to obtain the IP address of the DNS server which has the zone file associated with the top level domain. The resolver then accesses the identified DNS server using the obtained IP address, and with the label occupying the next highest position in the domain name hierarchy (the label immediately to the left of the top level label in the domain name) obtains the IP address of the DNS server which has the zone file associated with the queried label. The process continues until each label in the domain name has been resolved at which point the last queried DNS server provides the resolver with the IP address of the network device having the specified domain name. The resolver then transmits the received IP address to the originator's e-mail server.

Upon receipt of the IP address assigned to the recipient's e-mail server, the originator's e-mail server establishes a communications channel with the recipients e-mail server and then transmits the e-mail message over the communication channel, typically using Simple Mail Transfer Protocol (commonly referred to as "SMTP"; described in detail in RFC 821 and RFC 1869. "http://www.ietf.org"). After an initial handshaking stage during which the recipient's e-mail server acknowledges that it is willing to receive an e-mail message and that the recipient has established an e-mail account thereon, the originator's e-mail server transmits the e-mail message to the recipient's e-mail server and then closes the communications channel. Upon receipt of the e-mail message, the recipient's e-mail server caches the e-mail message in the directory associated with the recipient.

To retrieve the e-mail message, the recipient establishes a communications channel with the recipient's e-mail server, and retrieves the e-mail message over the communications channel, typically using Post Office Protocol—Version 3 (commonly referred to as "POP3"; described in detail in RFC 1939 and RPC 2449, "http://www.ietf.org"). Again, after an initial handshaking stage, during which the recipient's e-mail server acknowledges that it is ready to transmit e-mail messages to the recipient, the recipient authenticates itself with the e-mail server using an assigned username and password. After the recipient successfully authenticates itself, the recipient is then able to initiate transmission of the e-mail message over the communications channel to the recipient's local computer.

Although e-mail systems have been implemented successfully worldwide, using SMTP and POP3, conventional e-mail systems suffers from at least three main deficiencies. First, the domain names implemented by the DNS must follow the rules for ARPANET host names. Consequently, each domain name label associated with an e-mail server must begin and end with a "letter" or one of the numbers 0 to 9, and contain only "letters", the numbers 0 to 9 or a hyphen in between. Further, each "letter" can only be one of 'A' to 'Z' and 'a' to 'z'. As a result, the number of domain names available is severely limited. Second, the DNS system is case insensitive, so that two domain names which have identical spellings but whose component letters do not correspond in terms of their respective cases, will resolve to the same network address. Third, most e-mail servers only accept, for inclusion as part of an e-mail account name, the hyphen, the numbers 0 to 9 and the letters 'A' to 'Z' and 'a' to 'z', thereby limiting the number of account names available.

Therefore, there remains a need for an electronic mail system which expands upon the number and type of characters available for the account name component and the domain name component of e-mail addresses.

SUMMARY OF THE INVENTION

According to a first aspect of the present invention, there is provided an electronic mail server and a method for facilitating e-mail communication over a network which address deficiencies of the prior art electronic mail systems.

The electronic mail server, according to the first aspect of the invention, includes an account name database and an account name processor in communication with the account name datable for providing a response to a message received over the network. Typically, the message includes an e-mail account name label comprising at least one account name character (having an account name character set type), with the character set type including a non-ASCII compatible character set. The account name database includes a number of database records, each identifying an e-mail account name comprising at least one record character having a record character set type, and a record character set identifier identifying the record character set type. The account name processor includes a correlation processor and a response processor. The correlation processor is configured to determine the correlation between the received e-mail account name label and the respective mail account names in accordance with the associated character set type. The response processor is in communication with the correlation processor and provides the response to the message in accordance with the correlation indication.

The method for facilitating e-mail communication, according to the first aspect of the invention, includes the steps of (1) receiving at an e-mail server a message comprising an e-mail account name label, the e-mail server maintaining at least one e-mail account each associated with an e-mail account name, with the account name label comprising at least one account name character having an account name character set type and with the character set type including a non-ASCII compatible character set; (2) determining the correlation between the received e-mail account name label and the respective e-mail account names in accordance with the associated character set type; and (3) responding to the message in accordance with the correlation indication.

According to a second aspect of the present invention there is provided an electronic message for facilitated electronic communication. The electronic message, according to the second aspect of the invention, includes a header portion and a data portion associated wit the header portion. The header portion includes an e-mail account name label, with the account name label comprising at least one account name character having an account name character set type), and with the character set type including a non-ASCII compatible character set. The data portion includes an originator field identifying an originator of the message and a recipient field identifying a recipient of the message, with one of the fields being associated with the e-mail account name label.

According to a third aspect of the present invention, there is provided an electronic mail account name database for facilitating electronic communication. The account name database, according to the third aspect of the invention, includes at least one database record, each comprising (1) an account name label associated with an e-mail account name, with the account name label including at least one record character having a record character set type; and (2) a record character set identifier identifying the record character set type.

BRIEF DESCRIPTION OF THE DRAWINGS

The preferred embodiment of the invention will now be described, by way of example only, with reference to the drawings, in which:

FIG. 3 is a schematic diagram of a sample record comprising the account name database;

DETAILED DESCRIPTION OF THE PREFERRED EMBODIMENT

Figure 1:
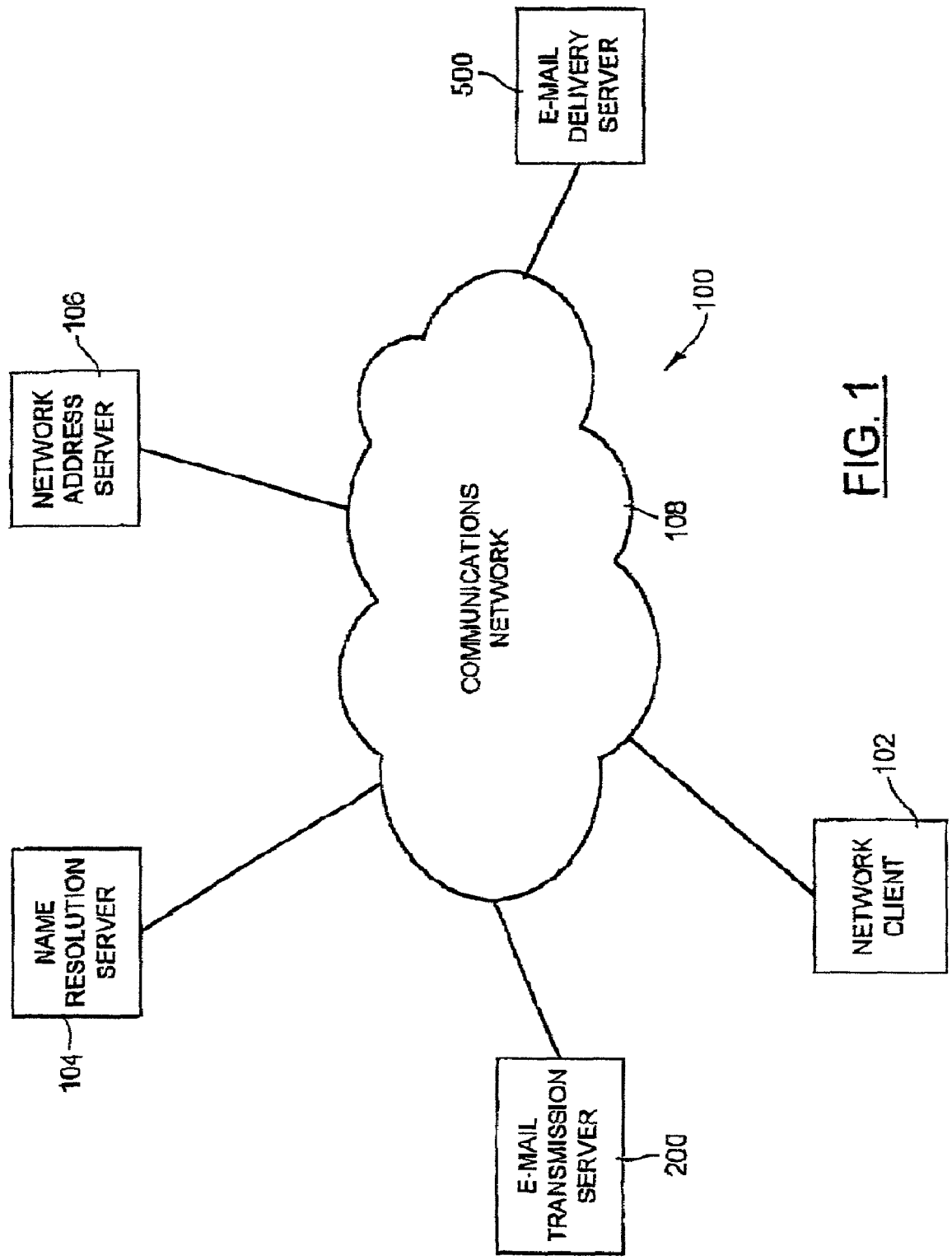
FIG. 1 is a schematic view of an electronic mail system, according to the present invention, depicting a plurality of network clients, a plurality of e-mail transmission servers, a plurality of e-mail delivery servers, and a communications network interconnecting the network clients and the e-mail servers.

Turning to FIG. 1, an electronic mail system, denoted generally as 100, is shown comprising a plurality of network clients 102, a plurality of a plurality of name resolution servers 104, a plurality of network address servers 106, a plurality of e-mail transmission servers 200, a plurality of e-mail delivery servers 500, and a communications network 108 interconnecting the network clients 102, the name resolution servers 104, the network address servers 106, the e-mail transmission servers 200 and the e-mail delivery servers 500. Preferably, the communications network 108 comprises the Internet, the e-mail transmission servers 200 comprise SMTP-based servers and the e-mail delivery servers 500 comprise POP3-based servers. However, the communications network 108 may also comprise other network forms, such as an intranet or a wireless network, and the e-mail server 200, 500 may employ protocols other than SMTP and POP3, if desired. Further, each e-mail transmission server 200 may be paired with an e-mail delivery serve 500, with both servers 500 residing on a common computer.

Preferably, each network client 102 comprises a personal computer equipped with software for communicating with the name resolution servers 104 and the e-mail servers 200, 500 over the communications network 108. Further, preferably the name resolution servers 104 and the network address servers 106 respectively comprise domain name resolvers and domain name servers, as described by Mockapetris in RFC 1034 and RFC 1035. Since RFC 1034 and RFC 1035 are publicly available documents, and since the structure and operation of domain name resolvers and domain name servers are well known to those skilled in the art, no description of the name resolution servers 104 and the network address servers 106 is required.

Figure 2:
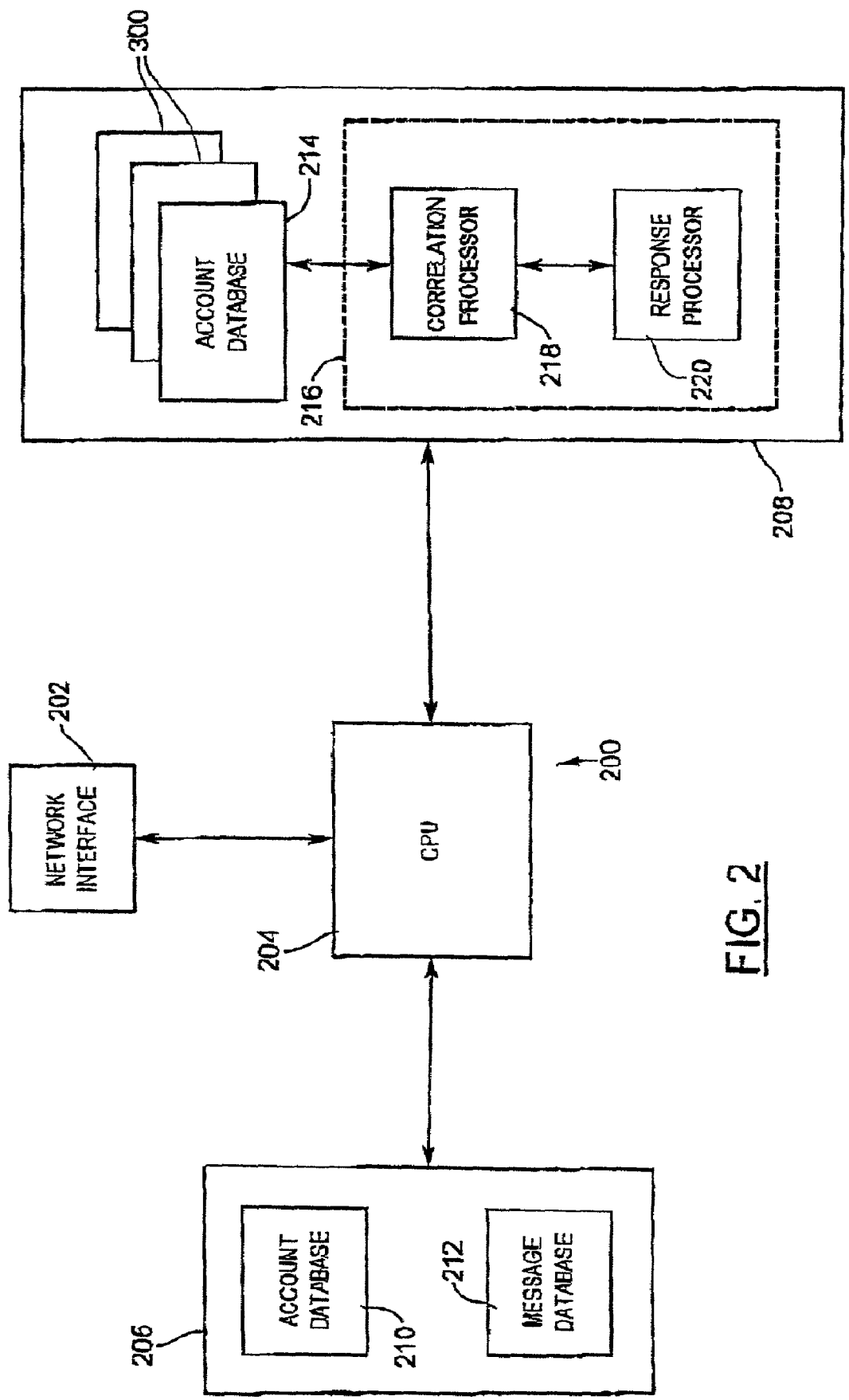
FIG. 2 is a schematic view of the e-mail transmission server shown in FIG. 1, depicting, the account name database and the correlation processor and the response processor of the account name processor.

As shown in FIG. 2, each e-mail transmission server 200 comprises a network interface 202 for communicating with the network clients 102 and other e-mail transmission servers 200 over the communications network 108, and a central processing unit (CPU) 204 in communication with the network interface 202, and a non-volatile memory (NVM) 206 and a volatile memory (RAM) 208 in communication with the CPU 204. Preferably the NVM comprises a magnetic or optical storage device, and includes a non-volatile account name database 210 which has records identifying each e-mail account managed by the e-mail transmission server 200, and an e-mail message database 212 which stores e-mail messages received from network clients 102. Consistent with the structure of SMTP-based e-mail servers, the e-mail message database 212 comprises a plurality of directories or electronic folders, each being associated with a respective e-mail account and including an inbox sub-directory and an outbox sub-directory.

The NVM 206 also includes processor instructions for the CPU 204 which establish in the RAM 208 a volatile account name database 214 as a copy of the non-volatile account name database 210, and a memory object defining an account name processor 216 in communication with the account name database 214. As will be appreciated, the account name database 214 is established in the RAM 208 to increase the speed of the account name resolving process and may be dispensed with in applications where speed is not a paramount concern.

The account name database 214 of each e-mail transmission server 200 includes a plurality of database records 300, each being associated with an e-mail account. The structure of a typical database record is shown in FIG. 3. As shown, each database record 300 includes a plurality of character 302 which together define an e-mail account name 304*a*, and a character set identifier 306*a* identifying the character set of which the characters 302 comprising the e-mail account name 304*a* are members. However, it will be appreciated that the character codes used to define and e-mail account name using one character set could define another e-mail account name using another character set. Accordingly, to allow the e-mail transmission server 200 to communicate with other SMTP servers which do not comply with the account name resolving process described below (ie. do not transmit a character set identifier to identify the character set used to define the username component of an e-mail address), preferably each database record 300 includes a plurality of alias e-mail account names 304*b*, 304*c*, 304*d* each having an associated (different) character set identifier (306*b*, 306*c*, 306*d*).

In the example shown, the e-mail account names 304*a*, 304*b* use the same character codes, but employ different character sets (Chinese character sets Big5 and GB2312) to define the respective e-mail account names. The e-mail account names 304*a*, 304*c* employ different character sets (Chinese Character sets Big5 and GB2312), but define the same account name using different character codes. The e-mail account names 304*c*, 304*d* again employ different character sets (Chinese Character sets Big5 and GB2312), but use the same character codes to define different account names. As will be explained below, by uniquely soliciting each e-mail account with an e-mail aunt name 304*a* and a plurality of e-mail account name aliases 304*b*, 304*c*, 304*d*, the e-mail transmission server 200 is able to resolve an account name defined using any of a plurality of different character sets, even if the e-mail address received does not include a character set identifier (described below). However, it is a goal of the electronic mail system 100 to eventually standardize the character set used by all e-mail servers to a multinational character set, such as a Unicode-based character set, so that any account name can be defined in any language without reference to a character set identifier. Consequently, it will be appreciated that the use of a character set identifier 306 and e-mail account aliases 304*b*. 304*c*. 304*d* are transitional measures to be used until such time as a standard is established for the multinational character set.

Turning again to FIG. 2, the account name processor 216 is shown comprising a correlation processor 218 and a response processor 220 in communication with the correlation processor 218. The correlation processor 218 is configured to determine a correlation between the account name component of an e-mail address, and the account names 304 identified in the account name database 214. In other words, the correlation processor 218 of each e-mail transmission server 200 is configured to determine whether an e-mail account name component of an e-mail message received over the communications network 108 has a corresponding entry in the e-mail transmission server's 200 account name database 214. The response processor 220 is configured to provide a response to the received e-mail message in accordance with the correlation indication.

Preferably, each e-mail transmission server 200 is configured, to recognize a plurality of different character sets, including a non-ASCII compatible character set (such as UTF-8: an 8-bit Unicode-based character set) to facilitate communication of e-mails (having multinational characters in the account name fields) with 8-bit e-mail servers. Further, preferably each e-mail transmission server 200 is configured to recognize a 7-bit ACE (ASCII Comparible Encoding) character set for backwards compatibility with 7-bit e-mail servers. However, as discussed above, it is a goal of the electronic mail system 100 to standardize the character set used by all e-mail servers to a multinational character set, such as a Unicode-based character set so that any account name can be defined in any language without reference to a character set identifier. Consequently, it will be appreciated that the use of an ACE character set is a transitional measure to be used until such time a standard is established for the multinational character set and all e-mail servers are capable of recognizing account names encoded with the multinational character set.

Figure 4:
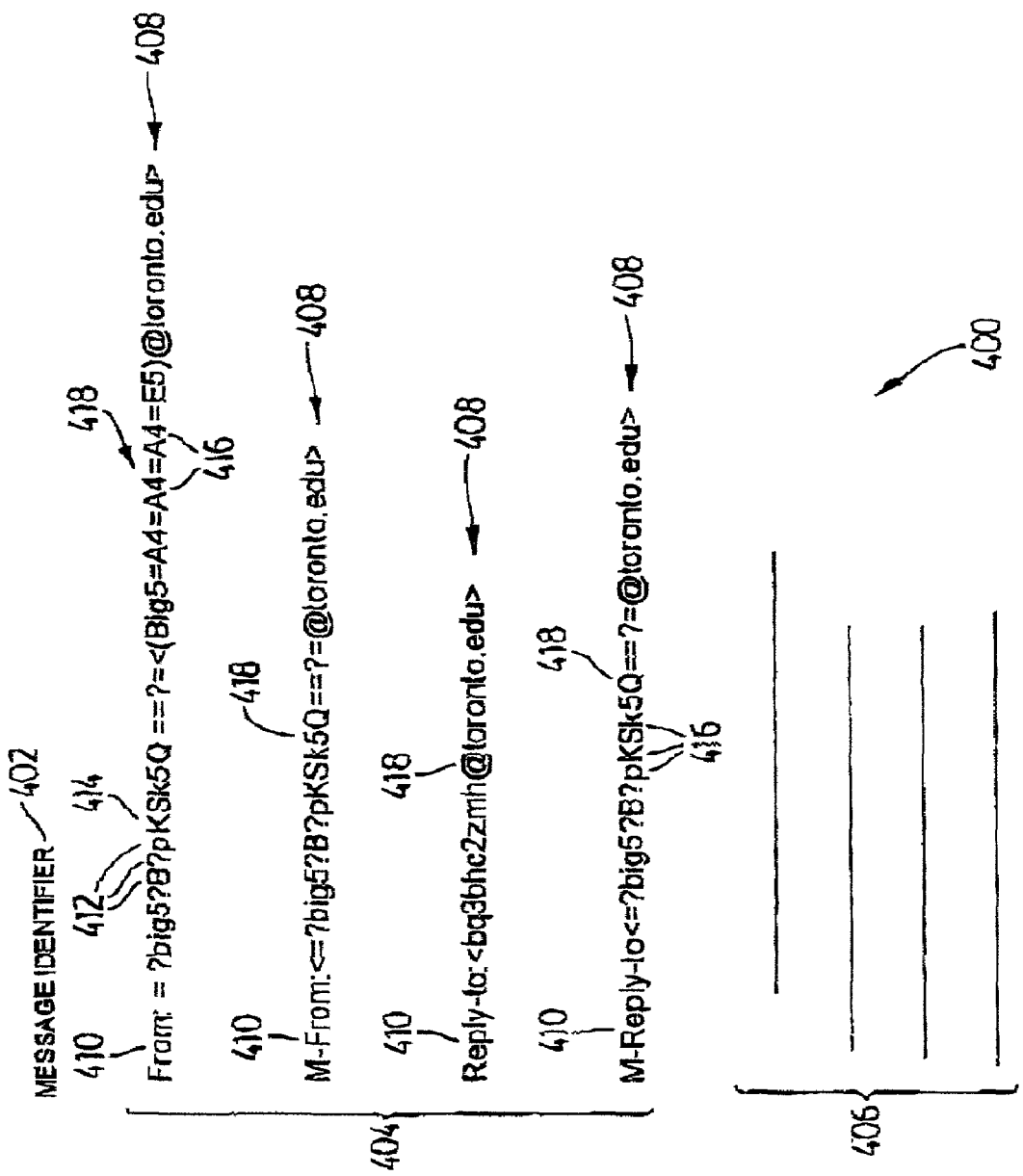
FIG. 4 is a schematic diagram of a sample e-mail message which can be transmitted between e-mail servers.

The structure of an e-mail message 400 (which could be transmitted between an originating e-mail transmission server 200 and a recipient e-mail transmission server 200) is shown in FIG. 4. As will be apparent, the e-mail message 400 is similar to the standard message format for Internet text messages described in detail in RFC 822 (available at "http://www.ietf.org") in that the e-mail message 400 includes a message ID 402, a text header portion 404 and a text body or data portion 406 associated with the header portion 404. The header potion 404 includes a plurality of header lines 408, each including a field identifier 410, a plurality of characters 412 which define account "nickname" 414, and a plurality of characters 416 associated with the field identifier 410 which define an e-mail account name 418.

The account names 418 respectively associated with the "M-FROM" and "M-REPLY-TO" field identifiers 410 are used by the e-mail transmission server 200 for the representation of account names using multinational characters. In particular, the "M-FROM" field identifier 410 defines the account name of the originator of the e-mail message, while the "M-REPLY-TO" field identifier 410 defines the account name to which replies should be transmitted. The "FROM" and "REPLY-TO" field identifiers 410 serve a similar purpose respectively as the "M-FROM" and "M-REPLY-TO" field identifiers 410, except that the account names associated with the "FROM" and "REPLY-TO" field identifiers 410 are defining using an ACE character set to ensure backwards compatibility with non-compliant client servers 102.

Figure 5:
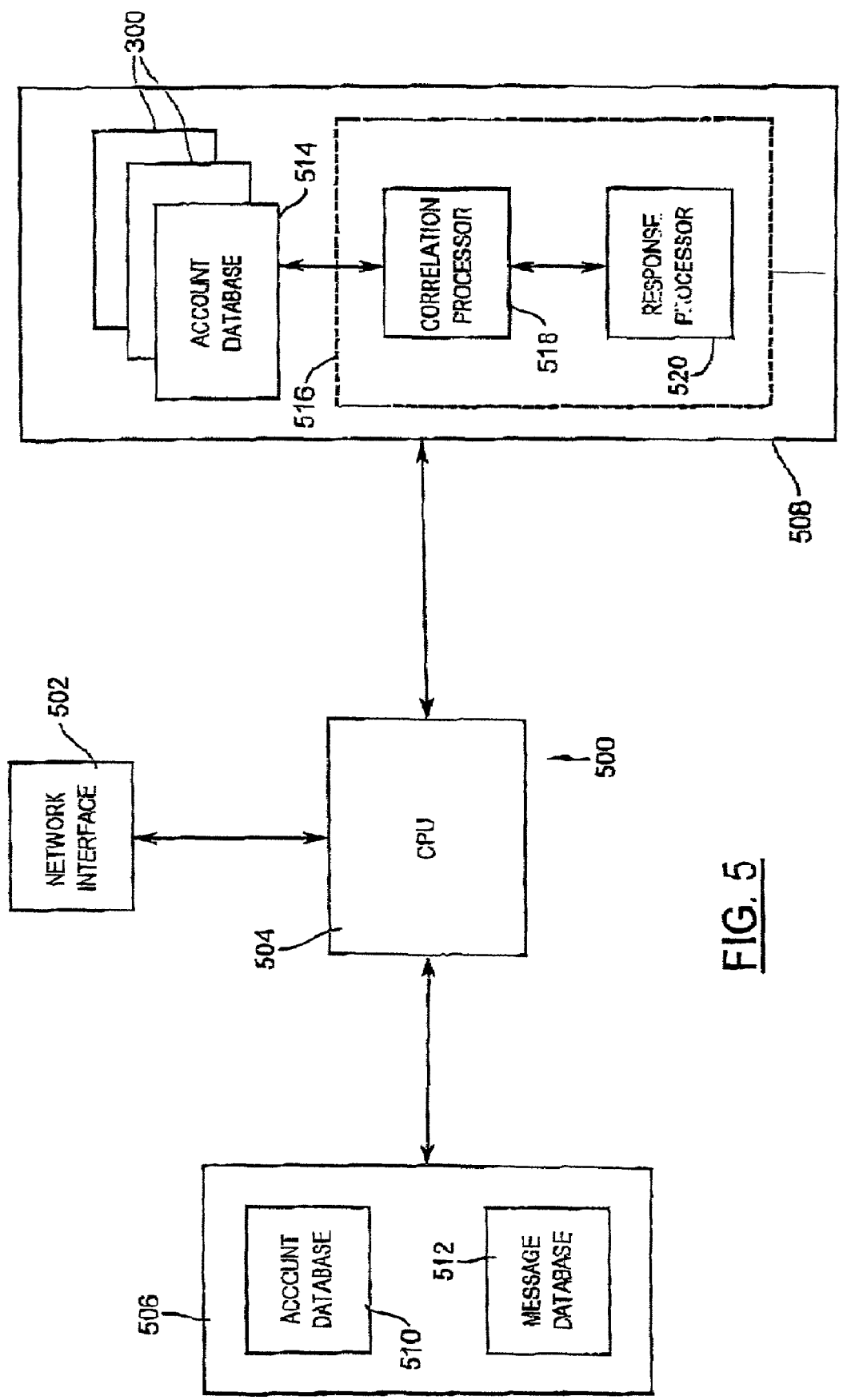
FIG. 5 is a schematic view of the e-mail delivery server shown in FIG. 1, depicting the account name database, and the correlation processor and the response processor of the account name processor, and FIGS. 6a and 6b together comprise a flow chart depicting the sequence of steps executed by the e-mail servers in transmitting an electronic mail message between network clients over the communications network.

The e-mail delivery server 500 is substantially similar in structure to the e-mail transmission server 200. As shown in FIG. 5, each e-mail delivery server 500 comprises a network interface 502 for communicating with the network clients 102 and the e-mail transmission servers 200 over the communications network 108, and a central processing unit (CPU) 504 in communication with the network interface 502, and a non-volatile memory (NVM) 506 and a volatile memory (RAM) 508 in communication with the CPU 504. Preferably the NVM 506 comprises a magnetic or optical storage device, and includes a non-volatile account name database 510 which has records identifying cash e-mail account managed by the e-mail delivery server 500, and a message database 512 for caching incoming e-mail messages.

The NVM 506 also includes processor instructions for the CPU 504 which establish in the RAM 508 a volatile account name database 514 as a copy of the non-volatile account name database 510, and a memory object defining an account name processor 516 in communication with the account name database 514. The account name database 514 of each e-mail delivery server 500 includes a plurality of database records 300, each being associated with an e-mail account. The account name processor 516 is shown comprise a correlation processor 518 and a response processor 520 in communication with the correlation processor 518. The correlation processor 518 is configured to determine a correlation between an account name received from a user of a network client 102, and the account names identified in the account name database 514 to determine whether the received account name is valid. The response processor 520 is configured to provide a response to the network client 102 in accordance with the correlation indication.

Figure 6A:
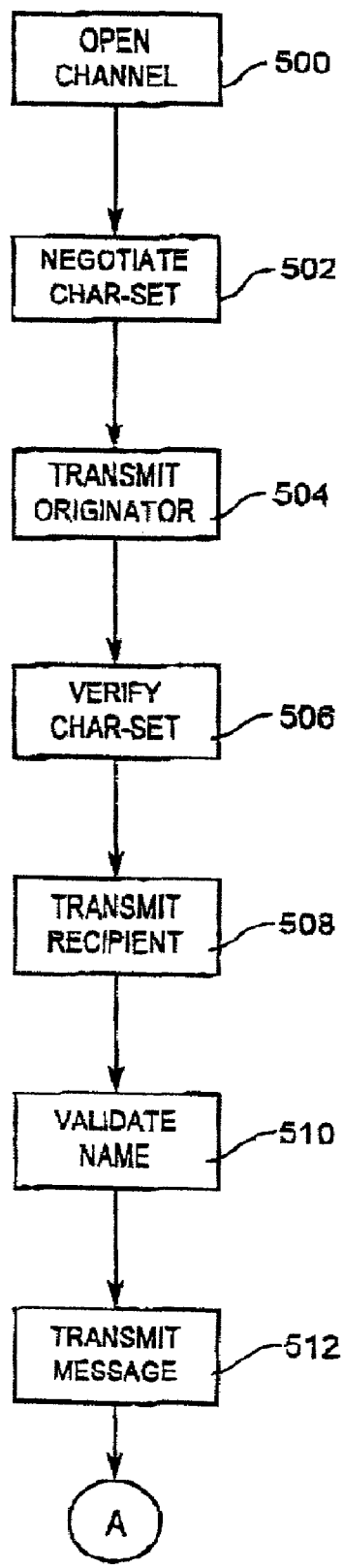
Figure 6B:
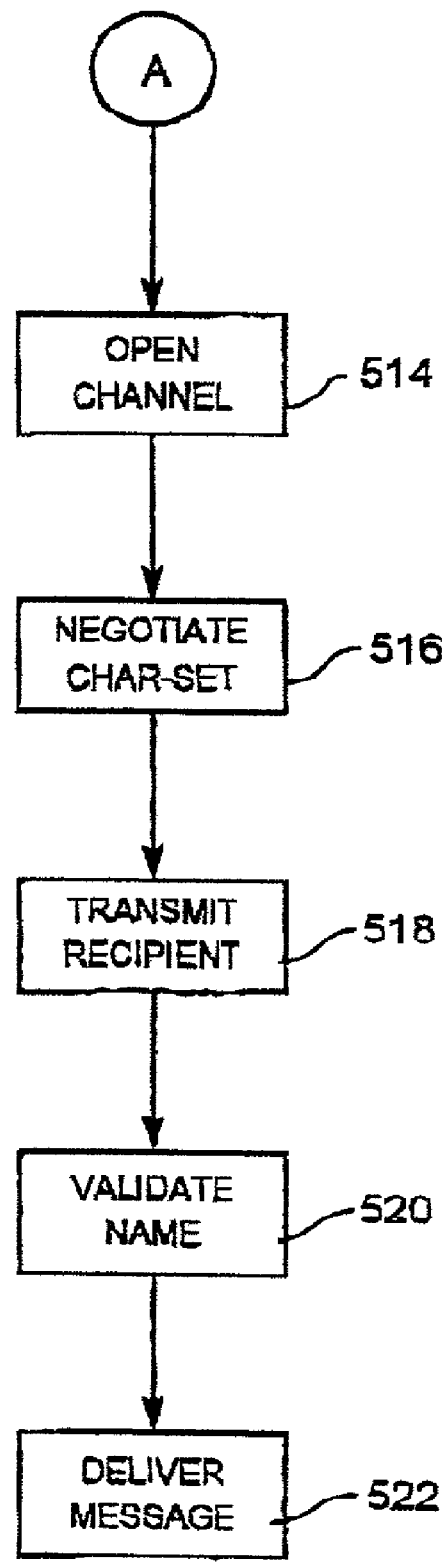

The operation of the electronic mail system 100 will now be described with reference to FIGS. 6a and 6b. Once the e-mail servers 200, 500 are deployed, upon power-up each e-mail server 200, 500 reads its respective database into its respective RAM. Then at step 500, one of the network clients 102 causes one of the e-mail transmission servers 200 (the "originating" e-mail transmission server 200) to open a communications channel with another one of the e-mail transmission servers 200 (the "receiving" e-mail transmission server 200) over the communications network 108 in order to send an e-mail message 400 to a recipient having an e-mail account established at the receiving e-mail transmission server 200. Consistent with the SMTP protocol, preferably each e-mail transmission server 200 is confined to wait for a connection on TCP port 25 for the initiation of an e-mail, transmission request.

Once a communications channel is established, at stop 502 the originating server 200 transmits a command to the receiving server 200, requesting that the receiving server 200 indicate whether it is capable of processing e-mail messages 400 having e-mail addresses incorporating multi-lingual characters and, if so, to provide the originating server 200 with a list of character sets recognized by the receiving server 200. In effect, at step 502 the originating server 200 attempts to negotiate a suitable character set with the receiving server 200. At step 504, the originating server 200 selects one of the identified character sets and transmits a "MAIL FROM" command to the receiving server 200, together with the account name of the originator of the e-mail massage 400 encoded in the selected character act and a "CHARSET" parameter defining the selected character set.

Upon receipt of the account name and the associated "CHARSET" parameter, at step 506 the account name processor 216 of the receiving server 200 determines whether the received "CHARSET" parameter identifies one of the character sets recognized by the receiving server 200. If the "CHARSET" parameter is recognized, the receiving server 200 replies with a positive acknowledgement, whereas if the "CHARSET" parameter is not recognized, the receiving server 200 replies with an error message.

After the appropriate character set is negotiated, at step 508 the originating server 200 transmits a "RCPT TO" command to the receiving server 200, together with the account name of the recipient of the e-mail message 400 encoded in the selected character set. Upon receipt of the account name, at step 510 the account name processor 216 of the receiving server 200 queries its account name database 214 with the received account name and the "CHARSET" parameter to determine whether the account name is valid. Alternately, if the originating server 200 does not provide the "CHARSET" parameter, the account name processor 216 of the receiving server 200 queries its account name database 214 with the received account name for an entry which matches an e-mail account name 304a or one of the alias account names 304b, 304c, 304d.

Upon receipt of a positive response from the receiving server 200, at step 512 the originating server 200 transmits the data portion of the e-mail message 400 to the receiving server 200 and then closes the communications channel with the receiving server 200. Alternately, in one variation, the originating server 200 only transmits the header portion 404 to the receiving server 200, together with a pointer to the data portion 406 where the data portion 406 is stored in the e-mail message database 212 on the originating server 200. This variation is particularly advantageous where the originator of the e-mail message 400 identifies several recipients for the e-mail message 400, all who have e-mail accounts established on the same receiving server 200 since it conserves disk space on the receiving server 200. Alternately, in yet another variation, the originating server 200 transmits the header portion 404 and the data portion 406 to the receiving server 200, and the receiving server 200 maintains in its e-mail message database 12 a single copy of the received e-mail message 400, and then provides the e-mail delivery server 500 with the header portion 404 and a pointer to the data portion 406 where the data portion 406 is stored in the e-mail message database 212 on the receiving server 200.

A sample SMTP session between an originating e-mail transmission server 200 (C) and a receiving e-mail transmission server 200 (S) is shown below, with the command "EHLO" being a command from the SMTP-extension, requesting a listing of supported modes and character sets from the receiving server 200. The selected character set is UTF-8, and the response "MATRX" to the "EHLO" command identifies that the receiving server 200 is compliant with the subject protocol:

S: <wait for connection on TCP port 25>
C: <open connection to server>
S: 220 mail.neteka.com—Server SMTP (NeBOX v.1.1)
C: EHLO mail.toronto.edu
S: 250-mail.neteka.com
S: 250-8BITMIME
S: 250 MATRX UTF-8 GB2312
C: MAIL FROM:<(E4 E8 AD E6 96 87)@toronto.edu>CHARSET-UTF-8
S: 250 Address Ok.
C: RCPT TO:<david@neteka.com>
S: 250 david@neteka.com OK
C: DATA Another sample SMTP session is shown below, where the selected character set is not supported by the receiving server 200:

C: EHLO mail.toronto.edu
S: 250-mail.neteka.com
S: 250-8BITMIME
S: 250 MATRX UTF-8 GB2312
C: MAIL FROM:<(A4 A4 A4 E5)@neteka.com>CHARSET=Big5
S: 504 command parameter not implemented
C: MAIL FROM:<(E4 E8 AD E6 96 87)@neteka.com>CHARSET=UTF-8
S: 250 Address Ok.

Alternately, in one variation, the "CHARSET" parameter is dispensed with, and the "MAIL FROM" and "RCPT TO" commands are relatively, replaced with the "M-MAIL FROM" and "M-RCPT TO" commands which indicate by way of implication that the UTF-8 character set is selected. A sample SMTP session using these additional commands is shown below:

C: EHLO mail.toronto.edu
S: 250 mail.neteka.com
S: 250-8BITMIME
S: 250 MATRX
C: M-MAIL FROM:<(E4 E8 AD E6 96 87)@neteka.com>
S: 250 Address Ok.

If, at step 502, the originating server 200 determines that the receiving server 200 is not capable of processing e-mail messages 400 having e-mail addresses incorporating multilingual characters, the originating server 200 should attempt to send any multilingual names in ACE format. Thus, in the following SMTP session example, the originating server 200 transmits a BIG5-encoded account name encoded in RACE format:

S: 220 mail.example.com—Server SMTP
C: EHLO mail.neteka.com
S: 500 Command not recognized: EHLO
C: HELO mail.netaka.com
S: 250 mail.example.com hello
C: MAIL FROM:<bq—3bhc2zmb@neteka.com>
S: 250 Address Ok.

In order for the e-mail message 400 to be delivered to the recipient after transmission to the receiving server 200, at step 514 the receiving e-mail transmission server 200 opens a communications channel with one of the e-mail delivery servers 500. Consistent with the POP3 protocol, preferably each e-mail delivery server 500 is configured to wait for a connection on TCP port 110 for the initiation of an e-mail delivery request.

Once a communications channel is established, at step 516 the receiving server 200 transmits a command to the delivery server 500, requesting that the delivery server 500 indicate whether it is capable of processing e-mail messages 400 having e-mail addresses incorporating multilingual characters and, if so, to provide the receiving server 200 with a list of character sets recognized by the delivery server 500. In effect, at step 516 the receiving server 200 attempts to negotiate a suitable character set with the delivery server 500. At step 518, the receiving server 200 selects one of the identified character sets and transmits a "USER" command to the delivery server 500, together with the account name of the recipient of the e-mail message 400 encoded in the selected character set and a "CHARSET" parameter defining the selected character set.

Upon receipt of tho account name and the associated "CHARSET" parameter, at step 520 the account name processor 516 of the delivery server 500 determines whether the received "CHARSET" parameter identifies one of the character sets recognized by the delivery server 500. If the "CHARSET" parameter is recognized, the account name processor 516 queries its account name database 514 with the received account name and the "CHARSET" parameter to determine whether the account name is valid. At step 522, the receiving server 200 then transmits the e-mail message 400 (or the header portion 404 and a pointer to the data portion 406, as discussed above) to the delivery server 500, and closes the communications channel with the delivery server 500.

A sample POP3 session between a receiving e-mail transmission server 200 (C) and an e-mail delivery server 500 (S) is shown below, with the command "CAPA" being a command from the POP3-extension, requesting a listing of supported modes and character sets from the delivery server 500.

S: +OK POP3 server ready
C: CAPA
S: +OK Capability list follows
S: TOP
S: USER
S: MATRX UTF-8 GB2312
S: .
C: USER (A4 A4 A4 E5)@neteka.com CHARSET=Big5
S: −ERR CHARSET=big5 not implemented
C: USER (E4 E8 AD E6 96 87)@neteka.com CHARSET=UTF-8
S: +OK welcome The present invention is defined by the claims appended hereto, with the foregoing description being illustrative of the preferred embodiment of the invention. Those of ordinary skill may envisage certain additions, deletions and/or modifications to the described embodiment, which although not explicitly described herein, do not depart from the spirit or scope of the invention, as defined by the appended claims.

We claim:

1. An electronic mail server for facilitating e-mail communication over a network, the electronic mail server comprising:

an account name database including a plurality of database records, each said record being associated with an e-mail account and including an e-mail address name comprising at least one record character having a record character set type, and a record character set identifier identifying the record character set type;

a message database; and an account name processor in communication with the account name database and the message database for processing at least one e-mail message received from a network device over the network, the e-mail message including an e-mail address comprising at least one e-mail address character, one of the address characters being a member of a non-ASCII character set, the account name processor including:
- a correlation processor configured to correlate the received e-mail address with one of the e-mail accounts; and
- a response processor in communication with the correlation processor for directing the received e-mail message to the message database in accordance with an outcome of the correlation.

2. The electronic mail server according to claim 1, wherein the correlation processor is configured to negotiate the character set with the network device, and to identify the one e-mail account from the received e-mail address and the negotiated character set.

3. The electronic mail server according to claim 1, wherein the received e-mail address includes a character set identifier identifying the character set, and the correlation processor is configured to identify the one e-mail account from the received e-mail address and the identified character set.

4. The electronic mail server according to claim 1, wherein the one e-mail account has associated therewith a plurality of the e-mail address names, each said e-mail address name comprising an e-mail address alias for the one e-mail account and being associated with one of the character set types, and the correlation processor is configured to perform the correlation operation by querying the e-mail address aliases with the received e-mail address.

5. A method for facilitating e-mail communication, comprising the steps of:
- negotiating a character set for an e-mail message between an e-mail server and a network device; wherein the character set may comprise a non-ASCII character set receiving at the e-mail server an e-mail message from the network device, the e-mail message including an e-mail address comprising at least one e-mail address character, one of the address characters being a member of the negotiated character set, the e-mail server maintaining at least one e-mail account having an e-mail address name associated with the e-mail account;
- correlating the received e-mail address with one of the e-mail accounts; and
- directing the received e-mail message to a message database in accordance with an outcome of the correlation.

6. The method according to claim 5, wherein the negotiating step comprises providing the network device with an indication of available character sets, and receiving from the network device an indication of a selected one of the available character sets.

7. The method according to claim 5, wherein the received e-mail address includes a character set identifier identifying the character set, the e-mail server maintains a plurality of database records, each said record being associated with a respective one of the e-mail accounts and including an e-mail address name comprising at least one record character having a record character set type, and a record character set identifier identifying the records character set type, and the correlation step comprises querying the database records with the received e-mail address and the receiver character set identifier.

8. The method according to claim 5, wherein the e-mail server maintains a plurality of database records, each said record being associated with respective one of the e-mail accounts and including an e-mail address name comprising at least one record character having a record character set type, and a record character set identifier identifying the record character set type, the correlated one e-mail account has associated therewith a plurality of the e-mail address names, each said e-mail address name comprising an e-mail address alias for the correlated one e-mail account and being associated with one of the character set types, and the correlating step comprises querying the e-mail address aliases with the received e-mail address.

9. The method according to claim 5, wherein the e-mail message comprises a header portion and a data portion, the header portion including the e-mail address, and the message receiving step comprises receiving the header portion and a pointer to the data portion.

* * * * *